United States Patent [19]
Plotkin

[11] 3,819,290
[45] June 25, 1974

[54] BRACE FOR RIGIDIFYING JOINTS BETWEEN ELONGATED STRUCTURAL MEMBERS

[75] Inventor: Victor Plotkin, Brooklyn, N.Y.
[73] Assignee: Spiegel Industries Corporation, Teaneck, N.J.
[22] Filed: Jan. 29, 1973
[21] Appl. No.: 327,330

[52] U.S. Cl. .............................. 403/388, 403/400
[51] Int. Cl. ............................................ A47f 7/18
[58] Field of Search .......... 403/179, 182, 384, 388, 403/390, 391, 397; 403/400

[56] References Cited
UNITED STATES PATENTS

| 2,523,785 | 9/1950 | Sereno | 403/391 X |
| 3,046,040 | 7/1962 | Luper | 403/388 |
| 3,300,784 | 1/1967 | Ervine | 403/388 X |
| 3,415,554 | 12/1968 | Papayoti | 403/388 X |
| 3,677,582 | 7/1972 | Flick | 403/391 |

FOREIGN PATENTS OR APPLICATIONS

| 204,314 | 7/1959 | Austria | 403/391 |
| 570,573 | 10/1961 | Belgium | 403/391 |
| 1,143,062 | 1/1963 | Germany | 403/400 |

Primary Examiner—Werner H. Schroeder
Attorney, Agent, or Firm—Alan H. Levine; Breitenfeld & Levine

[57] ABSTRACT

A brace comprising two pair of spaced apart parallel rods welded together in a "tic-tac-toe" pattern. The brace is located between two crosss elongated structural members, each pair of rods cradling one of the members. A bolt extends through aligned holes in the members and is secured by a nut to join the two members and the brace together in a rigid joint.

9 Claims, 3 Drawing Figures

PATENTED JUN 25 1974 3,819,290

BRACE FOR RIGIDIFYING JOINTS BETWEEN ELONGATED STRUCTURAL MEMBERS

This invention relates to apparatus for interconnecting elongated structurel members, and in particular to apparatus for connecting the members into a framework.

Framework structures or the like generally require rigidly connected members which cross each other. When structural beams are used to produce a framework, the connections are either provided by a plurality of rivets or welding. However, when lighter weight elongated members, such as tubes, are used as the structural members, and particularly when the structures are to be assembled for household purposes by laymen, riveting or welding is impracticable. To partially solve this problem, connections have been provided by passing a bolt through aligned holes in members which cross each other, and securing the bolt and members with a wing nut. While this approach provides connections having linear shear strength, the connections, with regard to torsional strength, are relatively weak, i.e., the elongated members can be rotated with respect to each other about the axis of the bolt, regardless of the degree to which the nut is tightened on the bolt. Since transverse forces applied to the structural members can produce significant torques and rotation between the connected members at the point of their connection, the use of bolts and nuts to provide the connections generally requires that the resulting framework include triangulating braces. Frequently, the use of triangulating braces in structures is objectionable because they take up or obstruct space which would otherwise be useful. Such would be the case, for example, if the structure were designed to provide a coat rack. Moreover, triangulating braces increase the cost of materials and labor required to assemble the structure.

Accordingly, it is an object of the present invention to provide apparatus for rigidly securing elongated structural members at predetermined angles to each other.

It is another object of the present invention to provide a brace for connecting elongated structural members which increases the torsional strength of the connection between the members.

It is still another object of the present invention to provide apparatus for connecting elongated structural members which may be used readily by laymen.

By way of summary, a brace for securing a pair of structural rods at a predetermined angle comprises: a first pair of parallel rods for cradling one of the elongated structural members between them, a second pair of parallel rods for cradling the other of the elongated structural members between them, and means for permanently and rigidly connecting the first pair of parallel rods to the second pair of parallel rods at the predetermined angle. Typically, the brace and the pair of elongated structural members are coupled together by a bolt and a nut. Thus, the brace and coupling means comprise apparatus for connecting elongated structural members at predetermined angles.

The above mentioned and other objects of this invention will become apparent by reference to the following description and the accompanying drawings, in which.

Figure 1:
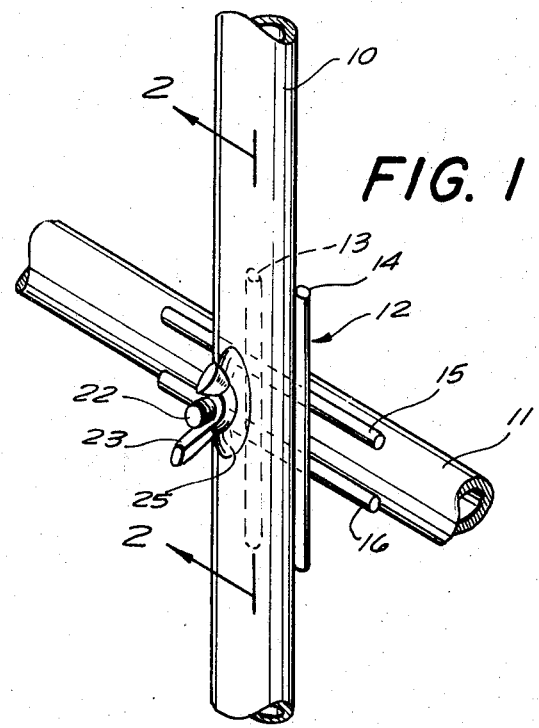
FIG. 1 is a fragmentary perspective view of tubes which are connected by apparatus according to the invention.
Figure 2:
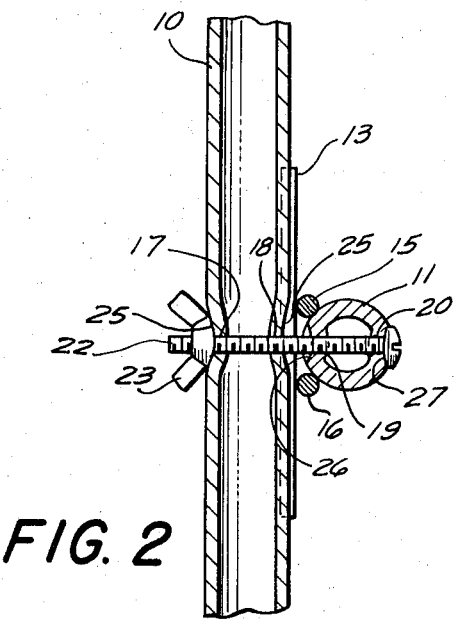
FIG. 2 is a cross-sectional view of the tubes and apparatus taken along lines 2—2 in FIG. 1.
Figure 3:
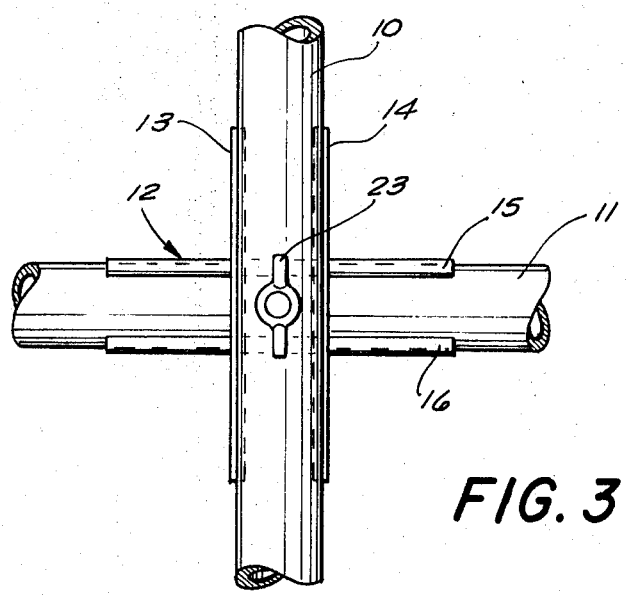
FIG. 3 is a front plan view of the tubes connected by the apparatus.

An illustrative embodiment of apparatus, according to the invention, for connecting a pair of elongated tubes 10 and 11, is shown in FIGS. 1, 2, and 3. Typically, the apparatus includes a brace 12 and means for coupling together the brace 12 and the tubes 10 and 11.

The brace 12 includes a pair of parallel rods 13 and 14 for supporting the tube 10 between them, a pair of parallel rods 15 and 16 for supporting the tube 11 between them, and means for connecting rods 13 and 14 to each of the rods 15 and 16. In this example, rods 13–16 are metallic and rods 13 and 14 are welded at right angles to rods 15 and 16, in a "tic-tac-toe" pattern.

When assembling the tubes 10 and 11, brace 12 is placed between them, as shown. The spacing between each pair of rods 13, 14, and 15, 16 is preferably smaller than the external diameter of the tube which they support, where the tubes are of circular cross-section as shown, so that each pair of rods serve to cradle their respective tube between them, and each tube does not quite touch the pair of rods supporting the other tube. However, if the brace 12 is used with elongated structural members having a square of rectangular cross-section, the parallel rods of each pair should be spaced apart a distance substantially equal to the external dimension of the member arranged between them. In such a case, one face of the member will rest against the pair of rods supporting the other member.

Referring to FIG. 2, tube 10 includes a pair of holes 17 and 18 which provide a passageway perpendicular to the axis of the tube 10, and tube 11 includes a pair of holes 19 and 20 which provide a passageway perpendicular to the axis of tube 11. Thus, the threaded body of a bolt 22 may be passed serially through to holes 20 and 19, through the rectangular central space between rods 13–16, and through holes 18 and 17. With the bolt 22 in place, as just described, the wing nut 23 may be tightened on the bolt, thereby bringing the head of the bolt and the wing nut closer to each other, and in the process, causing the head to press tube 11 against rods 15 and 16 and the wing nut 23 to press tube 10 against rods 13 and 14. When the tubes 10 and 11 and rods 13–16 are connected, as described above, a portion of tube 10 lies between rods 13 and 14, and a portion of tube 11 lies between rods 15 and 16. Thus, rods 13 and 14 prevent rotation of tube 10 about bolt 22, rods 15 and 16 prevent rotation of tube 11 about bolt 12, and since rods 13–16 are welded to each other, tube 10 cannot be rotated with respect to tube 11. Generally, the strength of this arrangement is dependent upon the length of the rods 13–16, the strength of the weld joints, and the spacing between the rods. With the design of this invention, engagement between the tubes and corresponding rods is assured while providing torsional strength to the overall connection.

Although it is not required, the tubes 10 and 11 may be flattened out in the areas 25–28 immediately surrounding the holes 17–20, respectively, to provide a firm seat for the head of the bolt 22 and the wing nut 23 regardless of the orientation of the tubes 10 and 11 when they are aligned against the brace 14.

In this embodiment the tubes 10 and 11 are aligned at right angles. However, the tubes 10 and all may be aligned at any predetermined angle provided that the rods 13 and 14 are connected to rods 15 and 16 at that predetermined angle. Although not shown, when small diameter tubes are being connected the space required between the rods 13–16 may not permit the use of a bolt. In such event, other coupling means which are well known to persons skilled in the art may be used to securely engage the tubes 10 and 11 against the brace.

From the foregoing, it may be seen that a simple brace which may be constructed from stock materials, in combination with common fasteners e.g., a bolt and nut, may be used to connect tubes or other elongated structural members. Moreover, the connection thus provided is capable of withstanding linear and torsional stresses which in a usual structure would require bracing rods or tubes. Also, it should be noted that the apparatus for providing the connection is of such a simple nature that it can be used by a layman having no special skill.

The present invention is particularly useful with structures, such as coat racks, which are intended to be assembled and disassembled many times during their useful life. Such a rigid joint is established without the necessity of tightening the nut 23 on the bolt 22 excessively, the nut and bolt can be secured together without the need for tools, and the nut can readily be removed from the bolt when the structure is to be disassembled.

It is to be understood that the description herein of a preferred embodiment according to the invention is set forth as an example thereof and is not to be construed or interpreted as a limitation on the claims which follow and define the invention.

What is claimed is:

1. A brace for supporting a pair of elongated structural members at a predetermined angle, comprising:
    a first pair of parallel rods for supporting one of the structural members between them,
    a second pair of parallel rods for supporting the other of the structural members between them, and
    means for permanently and rigidly connecting the first pair of parallel rods to the second pair of parallel rods at the predetermined angle.

2. A brace as defined in claim 1 wherein said rods are metallic and said means for connecting includes weld joints.

3. A structural joint comprising:
    two elongated structural members arranged at an angle to each other,
    a brace as defined in claim 1 arranged between said members, one of said members being parallel to and supported between said first pair of parallel rods, and the other of said members being parallel to and supported between said second pair of parallel rods, and
    coupling means for securing said members and brace together.

4. A structural joint as defined in claim 3 wherein said coupling means include a bolt and a nut for fastening the engaged structural members to each other.

5. A structural joint as defined in claim 4 wherein each of the structural members includes a transverse passageway, the body of said bolt is adapted to pass through said passageways and the head of the bolt is adapted to abut one of the structural members, and the nut is adapted to engage the bolt and abut the other structural member.

6. A structural joint as defined in claim 5 wherein each of the transverse passageways is substantially perpendicular to the axis of its corresponding rod.

7. A structural joint as defined in claim 6 wherein one of the members includes a seat for the head of the bolt and the other of the members includes a seat for the nut.

8. A structural joint as defined in claim 3 wherein each of said elongated structural members has a circular cross-sectional shape, and the parallel rods of each pair are spaced apart a distance less than the external diameter of the member which they support.

9. A structural joint as defined in claim 4 wherein each of said elongated structural members has a rectangular cross-sectional shape, and the parallel rods of each pair are spaced apart a distance about equal to one external cross-sectional dimension of the member which they support.

* * * * *